US012620809B2

(12) United States Patent (10) Patent No.: US 12,620,809 B2

Totterdell et al. (45) Date of Patent: May 5, 2026

(54) RELATING TO CONNECTING A DC CONVERTER TO A DC SYSTEM IN POWER TRANSMISSION NETWORKS

(71) Applicant: GE Infrastructure Technology LLC, Greenville, SC (US)

(72) Inventors: Anthony Totterdell, Stafford (GB); Omar Jasim, Stafford (GB)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/933,325

(22) Filed: Oct. 31, 2024

(65) Prior Publication Data

US 2025/0158410 A1 May 15, 2025

(30) Foreign Application Priority Data

Nov. 15, 2023 (EP) ..................................... 23210181

(51) Int. Cl.
*H02J 3/36* (2026.01)
*H02M 1/32* (2007.01)

(52) U.S. Cl.
CPC ..................................... *H02J 3/36* (2013.01); *H02M 1/32* (2013.01)

(58) Field of Classification Search
CPC ............... H02J 3/36; H02M 1/32; H02M 1/36
See application file for complete search history.

(56) References Cited

U.S. PATENT DOCUMENTS

2013/0257301 A1* 10/2013 Tran ........................ H02M 7/48
315/200 R

2018/0076619 A1* 3/2018 Gupta ....................... H02J 3/36
(Continued)

FOREIGN PATENT DOCUMENTS

| CN | 109149920 A | 1/2019 |
| CN | 109412187 A | 3/2019 |

(Continued)

OTHER PUBLICATIONS

English machine translation of CN114430178A published May 3, 2022 (Year: 2022).*

(Continued)

*Primary Examiner* — Rexford N Barnie

*Assistant Examiner* — David A Shiao

(74) *Attorney, Agent, or Firm* — Eversheds Sutherland (US) LLP

(57) ABSTRACT

A method for connecting a DC converter to a DC system using a connection circuit, the connection circuit including a first switch connected in series between the DC converter and a second switch, the second switch connected in series between the first switch and the DC system, and a resistive component connected in parallel with the second switch. The method includes operating the first switch from the open configuration to a closed configuration, such that a first current is able to flow through the connection circuit; determining the first current flowing through the connection circuit; adjusting a DC converter voltage of the DC converter, as a function of the first current, to reduce the first current through the connection circuit to or below a threshold value; and then operating the second switch from the open configuration to a closed configuration, thereby connecting the DC converter to the DC system.

15 Claims, 5 Drawing Sheets

(56) References Cited

U.S. PATENT DOCUMENTS

| | | | | |
|---|---|---|---|---|
| 2018/0241213 A1* | 8/2018 | Gupta | .................... | H02H 3/087 |
| 2020/0295563 A1* | 9/2020 | Lu | ............................ | H02J 1/00 |
| 2021/0265835 A1* | 8/2021 | Xie | ..................... | H02H 1/0007 |
| 2022/0045507 A1* | 2/2022 | Rupp | .................... | H02H 9/001 |
| 2023/0291303 A1* | 9/2023 | Unru | ....................... | H02M 1/32 |
| 2025/0149883 A1* | 5/2025 | Deshayes | ............. | H02J 7/0063 |

FOREIGN PATENT DOCUMENTS

| | | | | | |
|---|---|---|---|---|---|
| CN | 112653120 A | * | 4/2021 | | |
| CN | 114430178 A | | 5/2022 | | |
| EP | 3799244 A1 | * | 3/2021 | .............. | H02H 9/02 |

OTHER PUBLICATIONS

English machine translation of CN112653120A published Apr. 13, 2021 (Year: 2021).*
Extended European Search Report issued in EP Application No. 23210181.6 dated May 6, 2024, 10 pages.
Li et al: Development, Demonstration, and Control of a Testbed for Multiterminal HVDC System. IEEE Transactions on Power Electronics, vol. 32, No. 8, pp. 6069-6078, Aug. 2017.

* cited by examiner

RELATING TO CONNECTING A DC CONVERTER TO A DC SYSTEM IN POWER TRANSMISSION NETWORKS

FIELD

The subject matter herein relates generally to the field of power transmission networks and more specifically to connecting a DC converter to a DC system in power transmission networks.

BACKGROUND

In high voltage direct current (HVDC) power transmission networks, alternating current (AC) power is typically converted to direct current (DC) power for transmission via overhead lines, under-sea cables and/or underground cables. This conversion removes the need to compensate for the AC reactive/capacitive load effects imposed by the power transmission medium, i.e., the transmission line or cable, and reduces the cost per kilometer of the lines and/or cables, and thus becomes cost-effective when power needs to be transmitted over a long distance. DC power can also be transmitted directly from offshore wind parks to onshore AC power transmission networks, for instance.

The conversion between DC power and AC power is utilized where it is necessary to interconnect DC and AC networks. In any such power transmission network, power conversion means also known as converters (i.e., power converters in converter stations) are required at each interface between AC and DC power to affect the required conversion from AC to DC or from DC to AC.

The choice of the most suitable HVDC power transmission network or scheme depends on the particular application and scheme features. Examples of power transmission networks include monopole power transmission networks and bipole power transmission networks.

HVDC schemes often have a requirement to provide different operating configurations, for example to facilitate power transfer, or to connect multi-terminal or between multi-purpose schemes, or for static synchronous compensators (STATCOM), etc. To enable different operating configurations, it is often needed to connect a DC converter with a DC system.

SUMMARY

A connection circuit can be used to connect a DC converter with a DC system. The connection circuit can include a first switch connected in series between the DC converter and a second switch, the second switch connected in series between the first switch and the DC system, and a resistive component connected in parallel with the second switch. The resistive component is configured to reduce the magnitude of a current which may flow due to a voltage difference between a DC converter side voltage and a DC system side voltage. Conventionally, the connection process tends to require a signal indicative of the DC system voltage in order to facilitate a connection that does not cause an inrush current through the connection circuit, or disturbance on the DC system (for example, a voltage spike as discussed further below). Conventional controllers for connection circuits thus require specialist functionality.

There remains scope in providing improvement to existing methods of connecting a DC converter to a DC system in power transmission networks.

According to a first aspect, there is provided a method for connecting a direct current (DC) converter to a DC system using a connection circuit, the connection circuit comprising a first switch connected in series between the DC converter and a second switch, the second switch connected in series between the first switch and the DC system, and a resistive component connected in parallel with the second switch, wherein the first switch and the second switch are initially in an open configuration. The method comprises operating the first switch from the open configuration to a closed configuration, such that a first current is able to flow through the connection circuit; determining the first current flowing through the connection circuit; adjusting a DC converter voltage of the DC converter, as a function of the first current, to reduce the first current through the connection circuit to or below a threshold value; and thereafter operating the second switch from the open configuration to a closed configuration, thereby connecting the DC converter to the DC system. The methods described herein tend to allow for the connecting of the DC converter to the DC system with a minimum voltage difference, whilst not requiring a signal indicative of the DC system voltage.

When the first switch is operated into the closed configuration, a current path is established in the connection circuit whereby a current may flow between the DC converter and the DC system, through the resistive component. The flow of current tends to be dependent upon the presence of a voltage difference between the DC converter and the DC system. More specifically, this can occur when the DC converter is regulated to a DC voltage that is not equivalent to the voltage of the DC system. Ensuring the precise control of the DC converter voltage in relation to the DC system voltage can be particularly challenging if direct DC system voltage measurements are unavailable. In the methods described herein, because the current path includes the resistive component, even if there is a difference between the DC converter side voltage and the DC system voltage, the magnitude of the current will be relatively small compared to a current path which does not include such a resistive component. Put differently, the utilization of a 'soft resistor' can effectively manage any initial in-rush current.

The inventors have realized that, by determining the first current flowing through the connection circuit and adjusting a DC converter voltage of the DC converter as a function of the first current, the first current can be regulated to or below the threshold value (e.g., near zero) before the second switch is closed. This tends to mitigate for any temporally short but relatively high magnitude changes in DC current, which could otherwise affect DC system or DC converter performance. The second switch can thus be closed when there is a minimal current, if any, flowing in the connection circuit. Thus, when operated in accordance with the method, the connection circuit more effective at establishing a connection without disturbance or transient voltages or currents.

In particular, reducing the first current through the connection circuit to or below a threshold value; and thereafter operating the second switch from the open configuration to the closed configuration, tends to allow for the DC converter to be connected to the DC system with minimal disturbance, because there are no, or minimal, transient voltages when the DC converter connects with the DC system. This tends to improve the stability of the DC converter and the DC system. In a conventional method that does not operate the second switch after reducing the first current, the closing of the second switch tends to cause a disturbance in the DC system. This tends to cause any converters connected to the DC link or DC system to respond according to the magnitude of the disturbance at each terminal. The method of the present invention tends to prevent such disturbances.

Further still, the method tends not to require the voltage of the DC system to be known. As such, in circumstances in which the DC system voltage is not known or is not accessible for use by a controller or the connection circuit, the method tends to be able to connect the DC converter reliably and effectively to the DC system.

In some embodiments, the method further comprises, before operating the first switch: determining and providing an initial setpoint voltage to the DC converter, wherein the initial setpoint voltage configures the DC converter to output an initial DC converter voltage. By providing the initial setpoint voltage to the DC converter, any inrush current which develops when the first switch is closed tends be reduced to a minimum. This further tends to allow the resistive component to have a lower power rating, which allows for a more cost-effective connection circuit.

In some embodiments, the initial setpoint voltage is determined based on the normal operating range of the converter. Determining the initial setpoint voltage based on the normal operating range of the converter tends to bring the DC converter voltage closer to the DC system voltage, which tends to mitigate any inrush current that may develop when the first switch is closed.

In some embodiments, the initial setpoint voltage is determined based on an assumed pre-defined voltage value. Determining the initial setpoint voltage based on an assumed pre-defined voltage value tends to bring the DC converter voltage closer to the DC system voltage, which tends to mitigate any inrush current that may develop when the first switch is closed.

In some embodiments, the initial setpoint voltage is determined based on a value provided by an external device such as a DC grid controller. Determining the initial setpoint voltage based on a value provided by an external device such as a DC grid controller tends to bring the DC converter voltage closer to the DC system voltage, which tends to mitigate any inrush current that may develop when the first switch is closed.

In some embodiments, the adjusting of the DC converter voltage of the DC converter as a function of the first current comprises processing the first current using a closed loop control system, wherein the first current forms part of a feedback loop of the closed loop control system.

In some embodiments, the threshold value is 10A or 5A. In some embodiments the threshold value is a percentage of a nominal current value of the second switch, preferably less than or equal to 0.5% or more preferably less than or equal to 0.25%.

In some embodiments, before the operating the first switch from the open configuration to the closed configuration, the method further comprises receiving a first command to connect the DC converter to the DC system.

In some embodiments, the method further comprises determining if the first current has been reduced to or below the threshold value.

In some embodiments, the method further comprises, responsive to a determination that the first current has been reduced to or below the threshold value, providing a second command wherein the second command causes the DC converter to stop adjusting the DC converter voltage, such that the DC converter voltage remains constant.

The second command may be provided before or after operating the second switch.

In some embodiments, the operating the second switch from the open configuration to the closed configuration comprises providing a third command to the second switch, after the second command has been provided.

According to a second aspect, there is provided a controller for controlling a connection circuit and a DC converter to connect the DC converter to a DC system, the connection circuit comprising a first switch connected in series between the DC converter and a second switch, the second switch connected in series between the first switch and the DC system, and a resistive component connected in parallel with the second switch, wherein the first switch and the second switch are initially in an open configuration; the controller comprising a first connection configured to connect the controller to a node, wherein the node is in series with the first switch; a second connection configured to connect the controller to the first switch; a third connection configured to connect the controller to the second switch; a fourth connection configured to connect the controller to the DC converter. The controller is configured to operate the first switch via the second connection from the open configuration to a closed configuration, such that a first current is able to flow through the connection circuit; determine via the first connection the first current flowing through the connection circuit; adjust via the fourth connection a DC converter voltage of the DC converter, as a function of the first current, to reduce the first current through the connection circuit to or below a threshold value; and thereafter operate the second switch via the third connection from the open configuration to a closed configuration, thereby connecting the DC converter to the DC system.

Generally, the controller tends to be configured to execute the methods described herein.

In some embodiments, the controller further comprises a current module configured to determine the first current flowing through the connection circuit.

In some embodiments, the controller further comprises a switch control module configured to operate the first switch and the second switch.

In some embodiments, the controller further comprises a processing module configured to adjust the DC converter voltage of the DC converter.

According to a third aspect, there is provided a connection circuit for connecting a DC converter to a DC system, the connection circuit comprising a first switch; a second switch; and a resistive component. The first switch is connected in series between the DC converter and the second switch; the second switch is connected in series between the first switch and the DC system; and the resistive component is connected in parallel with the second switch. The connection circuit further comprises the controller of the second aspect, the controller being configured to control the DC converter, the first switch, and the second switch to connect the DC converter to the DC system.

According to a fourth aspect, there is provided a power transmission network, comprising a DC converter; a DC system; and the connection circuit of the third aspect. The DC converter is connected to the first switch and the DC system is connected to the second switch of the connection circuit.

In some embodiments, the DC system is any one of: a DC power transmission network; another DC converter; a DC distribution network; a multi-terminal DC node; a multi-purpose DC network; and/or an interconnection between different DC schemes.

In some embodiments, the DC converter is an AC-to-DC converter or a DC-to-DC converter.

According to a fifth aspect, there is provided a computer program comprising instructions which when executed by a processor of a controller for controlling a connection circuit and a DC converter, cause the controller to perform the method of the first aspect.

According to a sixth aspect, there is provided a non-transitory computer-readable storage medium comprising the computer program of the fifth aspect.

Generally, the disclosure herein provides a controller for controlling a connection circuit and a DC converter to connect the DC converter to a DC system, the connection circuit comprising a first switch connected in series between the DC converter and a second switch, the second switch connected in series between the first switch and the DC system, and a resistive component connected in parallel with the second switch, wherein the first switch and the second switch are initially in an open configuration; the controller comprising a first connection configured to connect the controller to a node, wherein the node is in series with the first switch; a second connection configured to connect the controller to the first switch; a third connection configured to connect the controller to the second switch; a fourth connection configured to connect the controller to the DC converter. The controller is configured to execute the methods described herein.

It will be appreciated that particular features of different aspects of the invention share the technical effects and benefits of corresponding features of other aspects of the invention. More specifically, the controller, the connection circuit, the power transmission network, the computer program, and the non-transitory computer-readable medium, share the technical effects and benefits of the method of the invention.

It will also be appreciated that the use of the terms "first" and "second", and the like, are merely intended to help distinguish between similar features and are not intended to indicate a relative importance of one feature over another, unless otherwise specified.

Within the scope of this application, it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible.

BRIEF DESCRIPTION OF THE DRAWINGS

Embodiments of the invention will now be described by way of example only and with reference to the accompanying drawings, in which.

DETAILED DESCRIPTION

Figure 1:
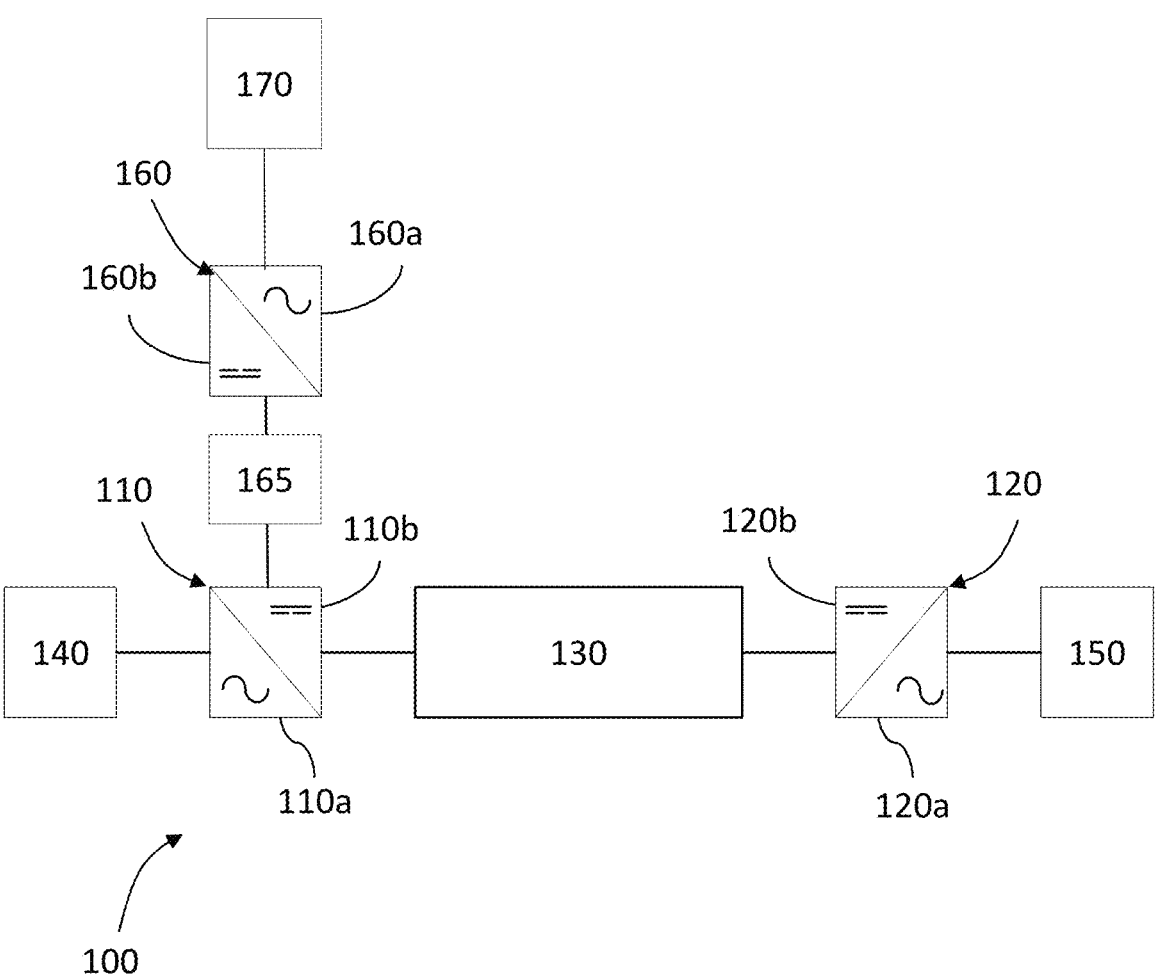
FIG. 1 shows an example of a power transmission network, including a DC converter, a DC system, and a connection circuit.

FIG. 1 is a schematic illustration (not to scale) of an example of a power transmission network 100. The illustration is not intended to be limited to representing a particular power transmission scheme, such as a monopole or bipole HVDC transmission network, but is moreover provided as a generic example illustrating principles of operation of a power transmission network that are useful for understanding the invention. In this manner, the power transmission network 100 may represent, generically, a monopole or bipole scheme, or may represent a multiterminal power transmission scheme, for instance. Hence whilst specific features in the illustration are shown connected to each other with a specific number of connections, it will be understood that this is not intended to be limiting either, but moreover to illustrate a generic connection between features/components. Related, is that relative dimensions or distances between components perceived in the illustration are also not intended to be limiting. It will therefore be understood that principles and features in the network 100 and herein discussed can be applied to networks comprising the controller 205 shown in FIGS. 2 and 3, or controllers, circuits or networks operated using the method 400 shown in FIG. 4.

The power transmission network 100 illustrates a first power conversion means 110 (also known as a converter station) and a second power conversion means 120. The power conversion means 110, 120, convert AC power to DC power (and vice versa), acting essentially as a rectifier (when converting AC power to DC power for transmission) and an inverter (when receiving DC power and converting to AC power). The power conversion means 110, 120, may each comprise a single converter in the case of a monopole system, or two converters in the case of a bipole system. The power conversion means 110, 120, may represent a plurality of converter stations arranged as a multi-terminal power transmission system. In this example, the first power conversion means 110 comprises a first AC side 110a and a first DC side 110b. In this example, the second power conversion means 120 comprises a second AC side 120a and a second DC side 120b.

The first power conversion means 110 is connected to a first AC network 140. The first AC network 140 is connected to the first AC side 110a of the first power conversion means 110.

The second power conversion means 120 is connected to a second AC network 150. The second AC network 150 is connected to the second AC side 120a of the second power conversion means 120. The first AC network 140 and/or the second AC network 150 may be electrical power transmission systems comprising power generation apparatus, transmission apparatus, distribution apparatus, and electrical loads. The first AC network 140 and/or the second AC network 150 may comprise a renewable power generation network such as a wind-power generation network, solar-power generation network, bio-power generation network, etc. The first AC network 140 or the second AC network 150 may be a consumer network. By way of non-limiting example, the first AC network 140 may be a power generation network, with the second AC network 150 being a consumer network, for instance.

Also illustrated is a power transmission medium 130 interconnecting the first power conversion means 110 and the second power conversion means 120. The power transmission medium 130 is connected between the first DC side 110b of first power conversion means 110 and the second DC side 120b of the second power conversion means 120. The power transmission medium 130 may comprise electrical cables and other electrical components interconnecting the first and second power conversion means 110, 120. For instance, the power transmission medium 130 may comprise a conductor providing a first electrical pole and/or a conductor providing a second electrical pole. A neutral arrangement may also be provided interconnecting the first and second power conversion means 110, 120. The power transmission medium 130 provides the medium through which DC power is transmitted between the power conversion means 110, 120.

The power transmission network 100 also includes a third power conversion means 160. The third power conversion means 160 may include any feature described above in relation to the first and/or second power conversion means 110, 120.

In particular, the third power conversion means 160 may be configured to convert AC power to DC power (and vice versa), acting essentially as a rectifier (when converting AC power to DC power) and an inverter (when receiving DC power and converting to AC power). Whilst not shown, other embodiments are envisaged wherein the third power conversion means 160 is a DC-DC converter that may convert DC power to DC power, acting essentially as a step-up or step-down voltage converter. In the non-limiting example shown in FIG. 1, the third power conversion means 160 comprises a third AC side 160a and a third DC side 160b.

The third power conversion means 160 is connected to a third AC network 170. The third AC network 170 is connected to the third AC side 160a of the third power conversion means 160.

The third AC network 170 may be an electrical power transmission system comprising power generation apparatus, transmission apparatus, distribution apparatus, and electrical loads. The third AC network 170 may comprise a renewable power generation network such as a wind-power generation network, solar-power generation network, bio-power generation network, etc. The third AC network 170 may be a consumer network. By way of non-limiting example, the third AC network 170 may be a power generation network, for instance.

The third DC side 160b of the third power conversion means 160 is connected to the first DC side 110b of the first power conversion means 110 via a connection circuit 165. The third power conversion means 160 is an example of a DC converter, and the first power converter 110 is an example of a DC system. The connection circuit 165 thus connects a DC converter to a DC system.

Although the example shown in FIG. 1 shows the third DC side 160b connected to the first DC side 110b via the connection circuit 165, other arrangements of a DC converter connected to a DC system are also possible. For example, the third DC side 160b could be connected directly to a side of the transmission medium 130, wherein the third DC side 160b would be a DC converter, and the side of the transmission medium 130 would be a DC system. In another example, the third DC side 160b could be connected to the second DC side 120b. Thus, the arrangement shown in FIG. 1 should not be seen as limiting to the invention.

The operation of the power transmission system 100 can be generically described as follows. The first AC power generation network 140 generates AC power that is provided to first power conversion means 110 at the first AC side 110a. The first power conversion means 110 converts the received AC power to a DC power for transmission to second power conversion means 120. The DC power is transmitted from the first DC side 110b over the power transmission medium 130 to the second DC side 120b of second power conversion means 120. The second power conversion means 120 converts the received DC power back to AC power. The AC power is then provided from the second AC side 120a to the second AC network 150 for consumption, for instance. In particular examples, the power conversion means 110 and 120 may be geographically remote. For instance, the first power conversion means 110 may reside with an off-shore wind farm and the second power conversion means 120 may reside on-shore.

It will be appreciated that various other electrical components may be located at any particular location or with any particular feature/component in the example power transmission system 100. These may include switches, transformers, resistors, reactors, surge arrestors, harmonic filters and other components well known in the art.

It will be appreciated that converters or power conversion means may comprise a number of different technologies such as voltage sourced converters (for instance using insulated gate bipolar transistor (IGBT) valves). Such converters may generally be considered to use 'power electronics'. Power electronic converters may comprise multi-level voltage sourced converters, for instance.

It will be appreciated that cables used as power transmission mediums may comprise the following non-limiting examples of crosslinked polyethylene (XLPE) and/or mass impregnated (MI) insulation cables. Such cables may comprise a conductor (such as copper or aluminium) surrounding by a layer of insulation. Dimensions of cables and their associated layers may be varied according to the specific application (and in particular, operational voltage requirements). Cables may further comprise strengthening or 'armouring' in applications such as subsea installation. Cables may further comprise sheaths/screens that are earthed at one or more locations.

Moreover, it will be understood that the power transmission network 100 may be used with three-phase power systems. In a three-phase power system, three conductors supply respective first, second and third phases of AC power to a consumer. Each of the first, second and third phases will typically have equal magnitude voltages or currents, which are displaced in phase from each other by 120°.

In a three-phase power system, phase currents and voltages can be represented by three single phase components: a positive sequence component; a negative sequence component; and a zero-sequence component. It is the positive sequence component that rotates in phase in accordance with the power system. Hence, in the idealistic scenario, only positive sequence voltage/current will exist. It will be understood that an unbalance in voltage or current between the first, second and third-phases, of a three-phase system, in magnitude or phase angle, can give rise to undesirable negative or zero-sequence components. Such an unbalance can be caused by fault conditions, for instance in the AC networks 140, 150, 170.

The power transmission network 100 may be operated using methods such as synchronous grid forming (SGFM) wherein either or all of the power conversion means 110, 120, 160 behave as three-phase, positive-phase sequence AC voltage sources behind an impedance, that operate at a frequency synchronous with over SGFM sources connected to the power transmission network 100.

The power transmission network 100 may further comprise a connection circuit 165 and a controller for connecting components of the power transmission network 100. For instance, a controller 205 (as shown in FIG. 2) may be provided to control a connection circuit 165 for electrically connecting a DC converter, for example the third power conversion means 160, to a DC system, for example the first power conversion means 110, in accordance with the methods described herein.

Figure 2:
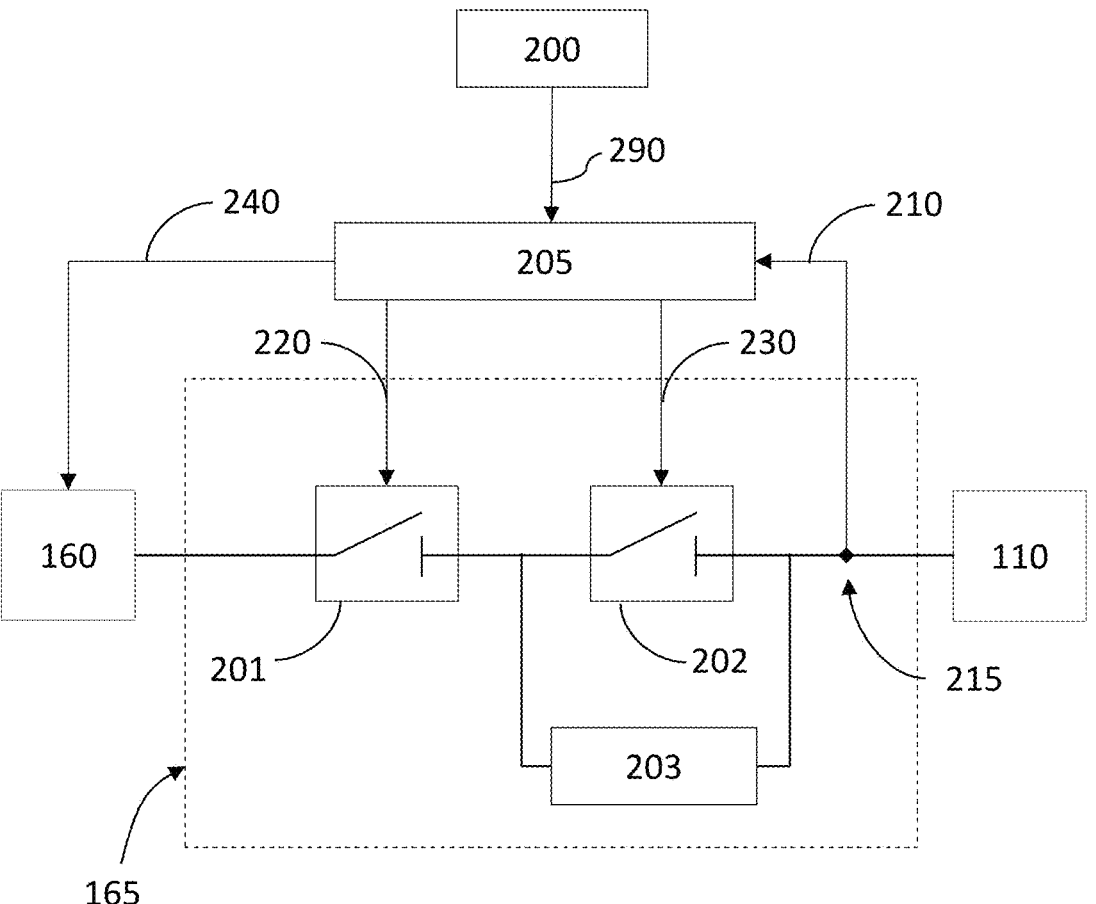
FIG. 2 shows a more detailed view of the connection circuit and a controller.

As shown in FIG. 2, in this example, the connection circuit 165 comprises a first switch 201, a second switch 202, and a resistive component 203. The first switch 201 is connected in series between the DC converter 160 and the second switch 202. The second switch 202 is connected in series between the first switch 201 and the DC system 110. The resistive component 203 is connected in parallel with the second switch 202.

The first and second switches 201, 202 may be a HVDC Disconnector such as a Knee Type, Center Break or Vertical Break.

The resistive component 203 may have a rating and size that will be suitably selected dependent on the electrical characteristics of the DC converter and the DC system. As such, the resistive component 203 will differ from one scheme to another. For example, a resistive component 203 used for a bipole scheme where the typical DC voltage is 525 kV will have a rating and size that will be different to that of a monopole scheme where the voltage may be 320 kV.

The controller 205 is connected to the connection circuit 165 by a first connection 210, a second connection 220, and a third connection 230. The controller is also connected to the DC converter 160 by a fourth connection 240. Each of the first to fourth connections 210, 220, 230, 240 is configured to transfer information, data, command signals or the like between the components it connects together. Each of the first to fourth connections 210, 220, 230, 240 may be a physical connection, or may be a wireless connection. Each of the first to fourth connections 210, 220, 230, 240 may be an electrical or optical cable, and may be an individual, separate cable, or may be comprised in an existing cable or bundle. For example, the first connection 210 may be an optical cable, or may be a wireless signaling means, or may be a data channel on an existing HVDC cable. It is thus to be understood that each of the first to fourth connections 210, 220, 230, 240 is a connection capable of transmitting analogue or digital data, or low power signals such as command signals or control signals and is not limited by the specific nature of the connection.

In the example shown in FIG. 2, the first connection 210 connects the controller 205 to the circuit 165 at a first node 215. The first node 215 is between the second switch 202 and the DC system 110. The first node 215 outputs analogue or digital data indicative of the current through the connection circuit 165 by hardware or other means that may already be in use (for example, for protection purposes) between the second switch 202 and the DC system 110. In operation, the data or signal produced at the first node 215 is transmitted via the first connection 210 to the controller 205 for processing. As a result, the first connection 210 connects the controller 205 to the connection circuit 165 such that the controller 205 is able to determine a current flowing between the DC converter 160 and the DC system 110. In some embodiments, the node 215 may be between the DC converter 160 and the first switch 201. It is to generally understood that the node 215 provides the controller 205 with data indicative of the current flowing between the DC converter 160 and the DC system 110 by utilizing hardware or means that are already in a close locality to the connection circuit 165.

The second and third connections 220, 230 connect the controller 205 to the first switch and second switches 201, 202 respectively. The second and third connections 220, 230 are configured to allow the controller 205 to control or to operate the first and second switches 201, 202, and further to allow the controller 205 to determine the state of the first and second switches 201, 202.

The fourth connection 240 connects the controller 205 to the DC converter 160. The fourth connection 240 is configured to allow the controller 205 to send and receive data to and from the DC converter 160.

Also shown in FIG. 2 is a first command signal 200 provided to the controller 205, via a sixth connection 290, which will be described in more detail later below.

Figure 3:
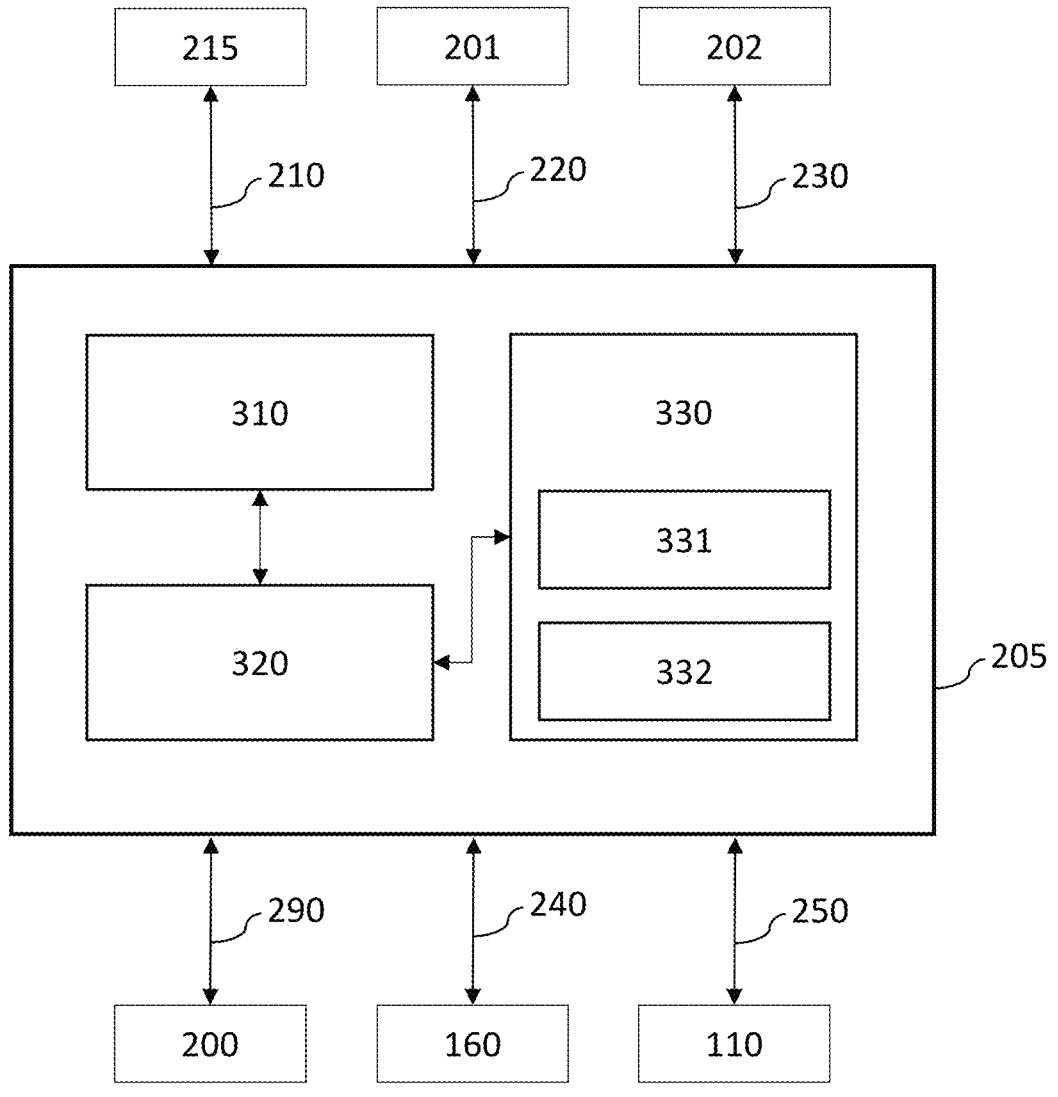
FIG. 3 shows an embodiment of a controller according to aspects of the disclosure herein.

FIG. 3 is a schematic illustration showing an embodiment of a controller 205 as may be used in implementing methods described herein.

In this embodiment, the controller 205 comprises a memory 310 and at least one processor 320. The memory 310 comprises computer-readable instructions, which when executed by the at least one processor 320, cause the controller 205 to perform the method(s) described herein.

In this embodiment, the controller 205 further comprises a transceiver arrangement 330. The transceiver arrangement 330 may comprise a separate transmitter 331 and receiver 332. The transceiver arrangement 330 may be used to operatively communicate with other components described herein either directly, using a wired or wireless means, or via a further interface such as a network interface. The transceiver arrangement 330 may for instance send and receive control signals using transmitter 331 and receiver 332. The control signals may contain or define electrical control parameters such as reference currents or reference voltages.

The at least one processor 320 is capable of executing computer-readable instructions and/or performing logical operations. The at least one processor 320 may be a microcontroller, microprocessor, central processing unit (CPU), field programmable gate array (FPGA) or similar programmable controller. The controller 205 may further comprise a user input device and/or output device. The processor 320 is communicatively coupled to the memory 310 and to the transceiver 330.

The memory 310 may be a computer readable storage medium. For instance, the memory 310 may include a non-volatile computer storage medium. For example, the memory 310 may include a hard disk drive, flash memory, etc.

Whilst not illustrated, the controller 205 may additionally include a user input device interface and/or a user output device interface, which may allow for visual, audible or haptic inputs/outputs. Examples of such user input/output devices include, but are not limited to, interfaces to electronic displays, touchscreens, keyboards, mice, speakers and microphones.

Referring again to FIG. 2, the connection circuit 165 is used to connect the DC converter 160 to the DC system 110. It is thus an objective of the connection circuit 165 to establish a low or zero resistance current path between the DC converter 160 and the DC system 110, without causing a disturbance to the DC system 110, and without the requirement for a signal indicative of the DC system side voltage. As discussed above, a problem with a conventional method to establish the connection is that a DC system side voltage is required. If, for example, there is a significant difference between a DC converter side voltage and a DC system side voltage, a relatively high current can flow through the connection circuit upon connection.

To alleviate this problem, there is provided a method to adjust a DC converter voltage of the DC converter 160 as a function of a current through the connection circuit 165.

This advantageously tends to allow for the current in the connection circuit to be reduced before the closing of the second switch 202. This tends to allow for the second switch 202 to be closed when there is a lower, e.g. minimal current, if any, flowing in the connection circuit 165. Resultantly, it tends to be possible to "downsize" the first and second switches 201, 202 (i.e., they do not need to withstand the same high current levels as switches operating using a conventional connection method). Thus, a more cost-effective connection circuit tends to be provided. Additionally, because the switches 201, 202 tend to have relatively lower current or voltage requirements compared to conventional systems, they tend to be more reliable owing to a lower failure rate of components at lower currents or voltages. Furthermore, the connection circuit can be operated without data or information from the DC system of a DC system voltage, thus allowing for the safe connection between the DC converter and the DC system in scenarios wherein such information is not available. Further still, the switches 201, 202 tend to have a relatively smaller device footprint compared to switches operated using a conventional method. Thus, a more space-efficient connection circuit tends to be provided.

Figure 4:
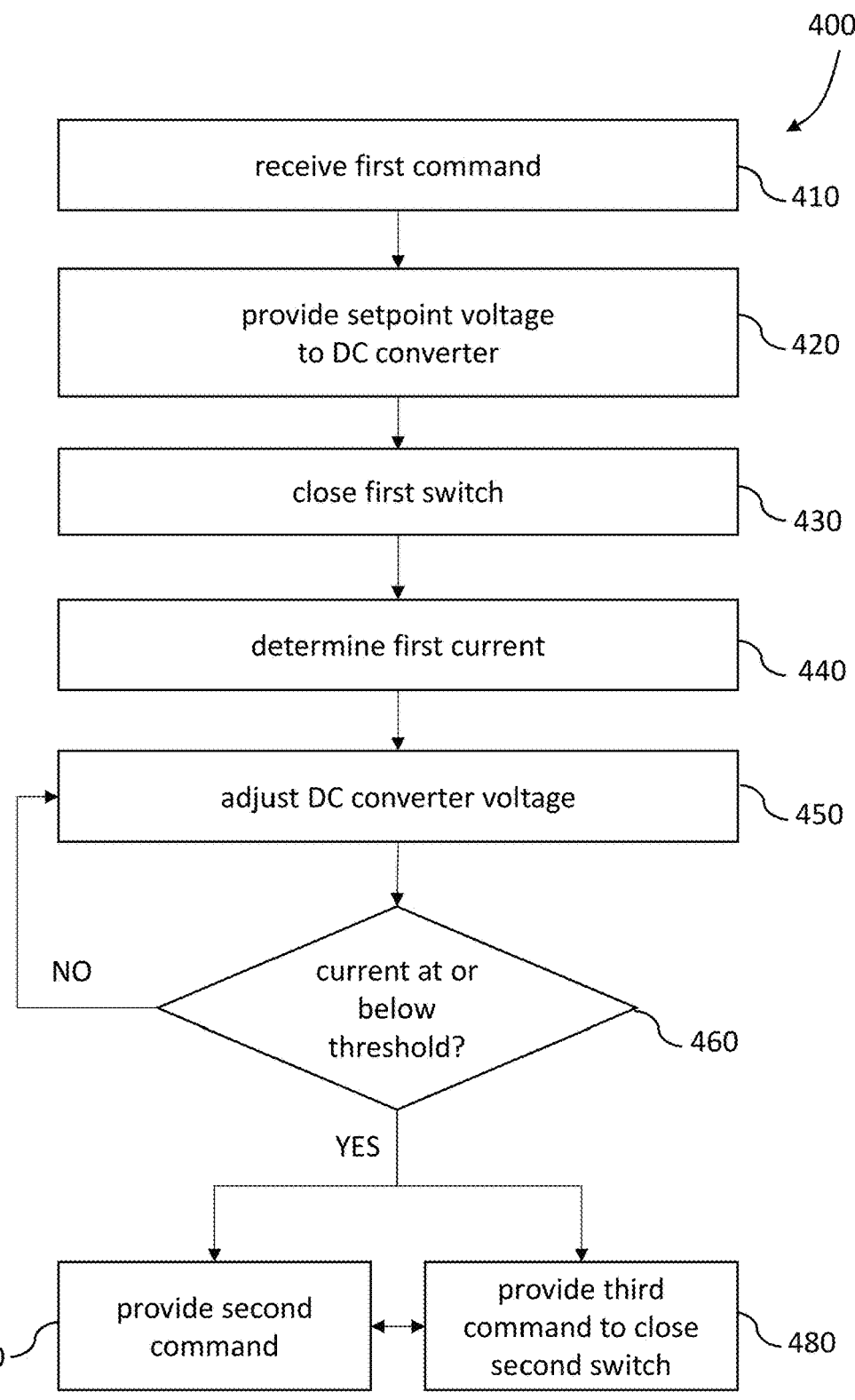
FIG. 4 shows an embodiment of a method according to aspects of the disclosure herein.

FIG. 4 is a process flow chart showing certain steps of an embodiment of a method 400 for connecting the DC converter 160 to the DC system 110 using the connection circuit 165.

It should be noted that certain of the process steps depicted in the flowchart of FIG. 4 and described below may be omitted or such process steps may be performed in differing order to that presented below and shown in FIG. 4. Furthermore, although all the process steps have, for convenience and ease of understanding, been depicted as discrete temporally-sequential steps, nevertheless some of the process steps may in fact be performed simultaneously or at least overlapping to some extent temporally.

In this embodiment, the first switch 201 and the second switch 202 are initially in an open configuration. In the open configuration, the switches 201, 202 do not provide a conducting path such that a current cannot flow through the switches 201, 202. In a closed configuration, the switches 201, 202 provide a conducting path such that a current can flow through the switches 201, 202 with minimal or zero resistance.

At step 410, the controller 205 receives a first command 200. The first command 200 can be provided to the controller 205 by, for example, a network controller, a grid controller, a user input, a monitoring system. The first command 200 instructs the controller 205 to connect the DC converter 160 to the DC system 110 via the connection circuit 165.

As a result of receiving the first command 200, at step 420 the controller 205 determines and provides an initial setpoint voltage to the DC converter 160. The initial setpoint voltage configures the DC converter 160 to output an initial DC converter voltage.

The initial setpoint voltage may be determined based on the normal operating range of the converter. The normal operating range of the converter may be stored internally to the controller 205 (i.e. in the memory 310). In other embodiments, the initial setpoint voltage may be determined based on an assumed pre-defined voltage value stored internally to the controller 205 (i.e. in the memory 310) or provided to the controller by a network controller or grid controller or by a user, for example as a part of the first command 200.

In a further step 430 the controller 205 operates the first switch 201 to switch from being in its open configuration to being in its closed configuration. Thus, a current path is established between the DC converter 160 and the DC system 110. This current path includes the first switch 201 and the resistive component 203. Because of the resistive component 203, the magnitude of the first current is limited by the resistive component 203.

At step 440, the controller 205 determines the first current flowing through the connection circuit 165. As discussed above, the node 215 is in series with the first switch 201 and may include a current transformer or other current sensing means. As a result, a current is measured or determined at the node 215. This is indicative of the current through the connection circuit 165, i.e., the first current. Because the node 215 is connected to the controller 205 via the first connection 210, the controller 205 can determine the current through the connection circuit 165.

At step 450, the controller 205 adjusts the DC converter voltage of the DC converter 160, as a function of the first current. Generally, a function is a relationship between a first variable that changes as a result of or based upon a second variable. The function may be represented by an equation or a block diagram (for example, an open or closed loop control system). Values of the first variable may be calculated by using the equation or block diagram. The calculated values of the first variable and associated values of the second variable may be stored together in a look up table, database or any suitable data storage means, in order to facilitate a means to quickly determine values for the first variable for a given value of the second variable. Alternatively, values for the first variable may be calculated in real time by a computer program, microcontroller, or the likes, however a real time calculation tends to be more resource intensive. Thus, the DC converter voltage is adjusted, as a function of the first current as described below, to reduce the first current through the connection circuit 165 to or below a threshold value.

Figure 5:
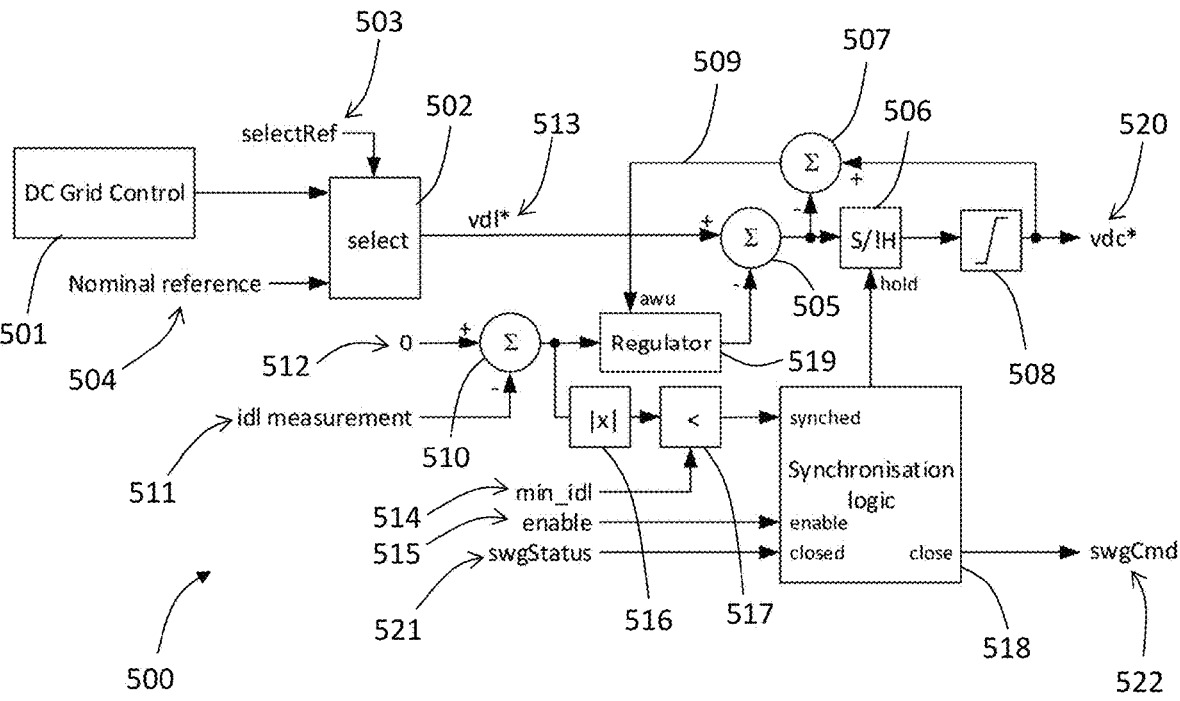
FIG. 5 shows an example of a closed loop control system.

In this embodiment, the controller 205 implements the function by using a closed loop control system 500, as depicted in FIG. 5 and described below, to determine the required DC converter voltage to reduce the first current. The first current forms part of a feedback loop of the closed loop control system 500.

The closed loop control system 500 shows a DC grid control 501 providing an input to a selection logic 502. A signal, denoted 'SelectRef' 503, is an input to selection logic 502. A further signal, denoted 'Nominal reference' 504, is also input to selection logic 502. The selection logic 502 outputs a signal 'vdl*' 513 to a first junction 505. The selection logic 502 determines the output vdl* 513 based on SelectRef 503 configuring the selection logic 502 to select either the DC grid control 501 or the Nominal reference 504 as the output signal vdl* 513.

The first junction 505 also receives a signal from a regulator 519, discussed further below. The first junction 505 subtracts the signal from the regulator 519 from vdl* 513 and outputs the result to a sample and hold block 506, and also to a second junction 507.

The sample and hold block 506 is configured to hold a data value or signal in response to receiving a hold command (i.e., the second command). The second command is provided to the sample and hold block 506 by a synchronization logic component 518, discussed further below. When the sample and hold block 506 receives the second command, it will hold the last value received from the first junction 505.

An output of the sample and hold block 506 is connected to a saturation block 508. The saturation block 508 outputs a signal, denoted 'vdc*' 520. The signal vdc* 520 is provided to the DC converter 160, such that the DC converter

160 can use the signal vdc* 520 to regulate the DC voltage output of the DC converter 160. The saturation block 508 is used to limit a maximum and a minimum output of the DC converter 160 by limiting the signal Vdc* 520.

The saturation block 508 also outputs the signal vdc* 520 to the second junction 507. The second junction 507 subtracts the signal from the first junction 505 from vdc* 520, and outputs a signal, denoted as 'awu' 509. The signal awu 509 is provided to the regulator 519. The signal awu 509 is an anti-windup signal for use in the regulator 519. The signal awu 509 is used in case the sample and hold block 506, or the saturation block 508, cause the signal vdc* 520 to reach an output limit. In this case, it is desired that the regulator 519 be paused, so that the regulator 519 does not continue integrating an error value.

The closed loop control system 500 further shows a reference value 512, which is provided to a third junction 510. A measured current value denoted 'idl measurement' 511, i.e., the first current measured at the first node 215 as shown in FIG. 2, is also provided to the third junction 510. The third junction 510 subtracts idl measurement 511 from the reference value 512, and outputs the result to the regulator 519, and also to a fourth component 516.

The regulator 519 can be, for example, an integral controller or a proportional-integral controller. The purpose of the regulator 519 is to provide integration of an error signal in the idl measurement 511. The regulator 519 outputs a signal to the first junction 505, such that the error can be subtracted from the signal vdl* 513. In this manner, the idl measurement 511 forms part of a closed loop feedback control system that is used to determine the DC converter voltage. Or, in other words, the DC converter voltage is adjusted as a function of the first current (also shown in FIG. 2 at node 215).

The fourth component 516 processes the received signal from the third junction 510 by calculating an absolute value, or a modulus value, of the signal from the third junction 510, and outputs the result to a fifth component 517. The fifth component 517 compares the signal from the fourth component 516 to a threshold value, denoted 'min_idl' 514, and outputs the result of the comparison (for example, true or false Boolean logic) to a synchronization logic component 518. Thus, min_idl 514 corresponds to the threshold value as discussed above, and can be set by a user to any desired value. In this example, the min_idl 514 signal is set to 10A, which is 0.5% of a nominal current value of the second switch. The synchronization logic component 518 further receives a signal, denoted 'enable' 515, and a signal, denoted 'swgStatus' 521.

The synchronization logic component 518 is configured to implement a second command, as discussed below, to cause the DC converter 160 to stop adjusting the DC converter voltage. The second command is implemented by the synchronization logic component 518 providing the sample and hold block 506 with a signal that causes the sample and hold block 506 to hold the last value received from the first junction 505, as discussed above. The synchronization logic component 518 determines when to implement the second command based on the output of the fifth component 517, and the enable signal 515. The enable signal 515 enables or disables the synchronization logic component 518. If the output of the fifth component 517 is true, and the enable signal 515 is also true, then the synchronization logic component 518 will output the second command to the sample and hold block 506. This will cause the signal vdc* 520 to be held at its current value, which will cause the output voltage of the DC converter 160 to remain constant. The second switch can then be closed.

The synchronization logic component 518 is also configured to implement a third command, as discussed below, to operate the second switch 202 to switch from being in the open configuration to being in the closed configuration. To implement the third command, the synchronization logic component 518 first receives a signal 'swgStatus' 521, which is indicative of a switch gear status, for example, the configuration of the second switch 202. The synchronization logic component 518, based on the method further discussed below, provides the third command via a signal 'swgCmd' 522.

As discussed above, a voltage difference between the DC converter 160 and the DC system 110 can lead to a current flowing between the DC converter 160 and the DC system 110 (i.e. the first current). The first current is thus indicative of a voltage difference between the DC converter voltage and the DC system voltage, and thus may be used as part of a control system to determine the DC converter voltage. Because of this, the DC converter voltage can be adjusted as a function of the first current, to reduce the first current through the connection circuit to or below a threshold value.

The threshold value is defined as an acceptable limit for the first current in which operating the second switch is acceptable. In some examples, the threshold value may be 10A or 0.5% of a nominal current value of the second switch. The threshold value may be determined based on the system requirements and operating parameters of the second switch.

Returning to method 400 and step 460, the controller 205 determines whether the first current is at or below the threshold value.

If it is determined that the first current is not at or below the threshold value, then the method 400 returns to step 450 at which the controller 205 further adjusts the DC converter voltage to reduce the first current.

On the other hand, if it is determined that the first current is at or below the threshold value, the method 400 proceeds to step 470 or to step 480.

At step 470, the controller 205 provides a second command to, for example, a control system, or a part thereof, that is controlling the DC converter 160. The second command causes the DC converter 160 to stop adjusting the DC converter voltage, such that the DC converter voltage remains constant. This tends to create a stable voltage condition in the connection circuit 165. The method then proceeds to step 480.

At step 480, the controller 205 provides a third command to the second switch 202. The third command operates the second switch 202 to switch from being in the open configuration to being in the closed configuration. Once the second switch 202 is closed, a low (e.g., minimal or zero) resistance current path is established between the DC converter 160 and the DC system 110. Operation of the second switch 202 is thus done in a manner that tends to benefit from the advantages as discussed above, and the DC converter 160 and the DC system 110 are electrically connected.

The method steps 470 and 480 may be performed in any particular order. In some conditions, there tends to be advantages to providing the third command before providing the second command, for example, if there is a need to close the second switch 202 within a certain time period and there is still a benefit to further reducing the first current. In these conditions, the method proceeds, from step 460, to step 480 and then to step 470.

In some embodiments, the steps 470 and the step 480 may be performed in parallel.

As discussed above, the methods described herein tend to allow for the connecting of the DC converter to the DC system with a minimum voltage difference, whilst not requiring a signal indicative of the DC system voltage. This tends to improve the operable environments of a connection circuit, for example, because the connection circuit does not require a signal indicative of the DC system, and therefore tends to be implementable in environments that may not have otherwise been possible.

Furthermore, in practice there may be a mismatch between the DC converter voltage and the DC system voltage, which may cause a disturbance in the DC system when the second switch is closed. However, such a disturbance tends not to be present when operating a connection circuit according to the methods described herein. One reason for this tends to be because the second switch 202 is closed only when the current through the connection circuit 165 is at or below the threshold value, i.e., it tends to be low compared to conventional methodologies.

Whilst the embodiments described herein disclose a DC converter and a DC system, it is to be understood that these are but examples of connecting between two DC voltages.

In particular, the DC system may be a DC power transmission network, another DC converter; a DC distribution network; a multi-terminal DC node; a multi-purpose DC network; and/or an interconnection between different DC schemes. The DC converter may be an AC-to-DC converter or a DC-to-DC converter.

Whilst the embodiments described herein disclose determining the initial setpoint voltage based on the normal operating range of the converter, it is to be understood that this is but one example of determining the initial setpoint voltage. In particular, in some embodiments, the initial setpoint voltage may be determined based on an assumed pre-defined voltage value. In other embodiments, the initial setpoint voltage may be determined based on a value provided by an external device such as a DC grid controller.

Reference throughout this specification to an example of a particular method or apparatus, or similar language, means that a particular feature, structure, or characteristic described in connection with that example is included in at least one implementation of the method and apparatus described herein. The terms "including", "comprising", "having", and variations thereof, mean "including but not limited to", unless expressly specified otherwise. An enumerated listing of items does not imply that any or all of the items are mutually exclusive, unless expressly specified otherwise. The terms "a", "an", and "the" also refer to "one or more", unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one, and only one, of any single item in the list. For example, "one of A, B and C" includes only A, only B or only C and excludes combinations of A, B and C. As used herein, "a member selected from the group consisting of A, B, and C" includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the disclosed method and apparatus are described with reference to schematic flowchart diagrams and/or schematic block diagrams of methods, apparatuses, systems, and program products. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The schematic flowchart diagrams and/or schematic block diagrams in the Figures illustrate the architecture, functionality, and operation of possible implementations of apparatuses, systems, methods, and program products. In this regard, each block in the schematic flowchart diagrams and/or schematic block diagrams may represent a module, segment, or portion of code, which includes one or more executable instructions of the code for implementing the specified logical function(s).

It will be appreciated that numerical values recited herein are merely intended to help illustrate the working of the invention and may vary depending on the requirements of a given power transmission network, component thereof, or power transmission application.

The listing or discussion of apparently prior-published documents or apparently prior-published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

We claim:
1. A method for connecting a direct current (DC) converter to a DC system using a connection circuit, the connection circuit comprising a first switch connected in series between the DC converter and a second switch, the second switch connected in series between the first switch and the DC system, and a resistive component connected in parallel with the second switch, wherein the first switch and the second switch are initially in an open configuration, the method comprising:

operating the first switch from the open configuration to a closed configuration, such that a first current is able to flow through the resistive component of the connection circuit;

determining the first current flowing through the connection circuit;

adjusting a DC converter voltage of the DC converter, as a function of the first current, to reduce the first current through the connection circuit to or below a threshold value; and thereafter operating the second switch from the open configuration to a closed configuration in response to the first current being reduced to or below the threshold value, thereby connecting the DC converter to the DC system.

2. The method of claim 1, further comprising, before operating the first switch, determining and providing an initial setpoint voltage to the DC converter, wherein the initial setpoint voltage configures the DC converter to output an initial DC converter voltage.

3. The method of claim 2, wherein the initial setpoint voltage is based on:

a normal operating range of the converter; and/or an assumed pre-defined voltage value; and/or a value provided by an external device such as a DC grid controller.

4. The method of claim 1, wherein the adjusting the DC converter voltage of the DC converter as a function of the first current, comprises:

processing the first current using a closed loop control system, wherein the first current forms part of a feedback loop of the closed loop control system.

5. The method of claim 1, wherein the threshold value is:

10A or 5A; or a percentage of a nominal current value of the second switch or less than or equal to 0.5% of the nominal current value of the second switch, or less than or equal to 0.25% of the nominal current value of the second switch.

6. The method of claim 1, wherein before the operating the first switch from the open configuration to the closed configuration, the method further comprises:

receiving a first command to connect the DC converter to the DC system.

7. The method of claim 1, further comprising:

determining if the first current has been reduced to or below the threshold value.

8. The method of claim 7, further comprising:

responsive to a determination that the first current has been reduced to or below the threshold value, providing a second command, wherein the second command causes the DC converter to stop adjusting the DC converter voltage, such that the DC converter voltage remains constant; and wherein the second command is provided before or after the operating the second switch.

9. The method of claim 8, wherein the operating the second switch from the open configuration to the closed configuration, comprises:

providing a third command to the second switch, after the second command has been provided to the DC converter.

10. A non-transitory computer readable storage medium storing thereon a computer program comprising instructions which when executed by a processor of a controller causes the controller to perform the method of claim 1 by controlling the connection circuit and the DC converter.

11. A controller for controlling a connection circuit and a direct current (DC) converter to connect the DC converter to a DC system, the connection circuit comprising a first switch connected in series between the DC converter and a second switch, the second switch connected in series between the first switch and the DC system, and a resistive component connected in parallel with the second switch, wherein the first switch and the second switch are initially in an open configuration; the controller comprising:

a first connection configured to connect the controller to a node, wherein the node is in series with the first switch;

a second connection configured to connect the controller to the first switch;

a third connection configured to connect the controller to the second switch;

a fourth connection configured to connect the controller to the DC converter;

wherein the controller is configured to:

operate the first switch via the second connection from the open configuration to a closed configuration, such that a first current is able to flow through the resistive component of the connection circuit;

determine via the first connection the first current flowing through the connection circuit;

adjust via the fourth connection a DC converter voltage of the DC converter, as a function of the first current, to reduce the first current through the connection circuit to or below a threshold value; and thereafter operate the second switch via the third connection from the open configuration to a closed configuration in response to the first current being reduced to or below the threshold value, thereby connecting the DC converter to the DC system.

12. A connection circuit comprising the controller of claim 11 for connecting the DC converter to the DC system, the connection circuit comprising:

the first switch;

the second switch; and the resistive component; wherein the first switch is connected in series between the DC converter and the second switch;

the second switch is connected in series between the first switch and the DC system; and the resistive component is connected in parallel with the second switch;

the controller being configured to control the DC converter, the first switch, and the second switch to connect the DC converter to the DC system.

13. A power transmission network comprising the connection circuit of claim 12, the power transmission network comprising:

the DC converter;

the DC system; and the DC converter is connected to the first switch and the DC system is connected to the second switch of the connection circuit.

14. The power transmission network of claim 13, wherein the DC system is any one of:

a DC power transmission network;

another DC converter;

a DC distribution network;

a multi-terminal DC node;

a multi-purpose DC network;

and/or an interconnection between different DC schemes.

15. The power transmission network of claim 13, wherein the DC converter is an AC-to-DC converter or a DC-to-DC converter.

\* \* \* \* \*